United States Patent [19]

Filo

[11] Patent Number: 4,872,063

[45] Date of Patent: Oct. 3, 1989

[54] METHOD TO INCREASE SCANNING RESOLUTION USING A SYNTHETIC APERTURE

[75] Inventor: Andrew Filo, Cupertino, Calif.

[73] Assignee: Optum Corporation, Calif.

[21] Appl. No.: 169,559

[22] Filed: Mar. 17, 1988

[51] Int. Cl.⁴ .............................................. H04N 1/04
[52] U.S. Cl. .................................... 358/474; 358/443; 358/456
[58] Field of Search ............... 358/285, 282, 293, 283, 358/284, 280

[56] References Cited

U.S. PATENT DOCUMENTS

| | | | |
|---|---|---|---|
| 3,600,506 | 8/1971 | Richeson | 358/282 |
| 3,652,791 | 3/1972 | Shuey | 358/282 |
| 3,928,718 | 12/1975 | Sagae | 346/75 |
| 4,099,208 | 7/1978 | Tasaku | 358/296 |
| 4,106,061 | 8/1978 | Burnett | 358/284 |
| 4,270,149 | 5/1981 | Ohta | 358/285 |
| 4,477,821 | 10/1984 | Yamamoto | 358/285 |
| 4,493,355 | 1/1985 | Reynolds | 356/358 |
| 4,638,372 | 1/1987 | Leng | 358/296 |
| 4,675,744 | 6/1987 | Mason | 358/282 |
| 4,691,241 | 9/1987 | Tomohisa | 358/285 |
| 4,754,143 | 6/1988 | Fukai | 358/285 |

Primary Examiner—Howard W. Britton
Assistant Examiner—Jerome Grant
Attorney, Agent, or Firm—Keith Kline

[57] ABSTRACT

A circuit for processing the electrical signals from a phototransistor viewing objects through a scanning aperture. The circuit reduces the apparent size of the viewing aperture for increased resolution in a scanning system.

13 Claims, 4 Drawing Sheets

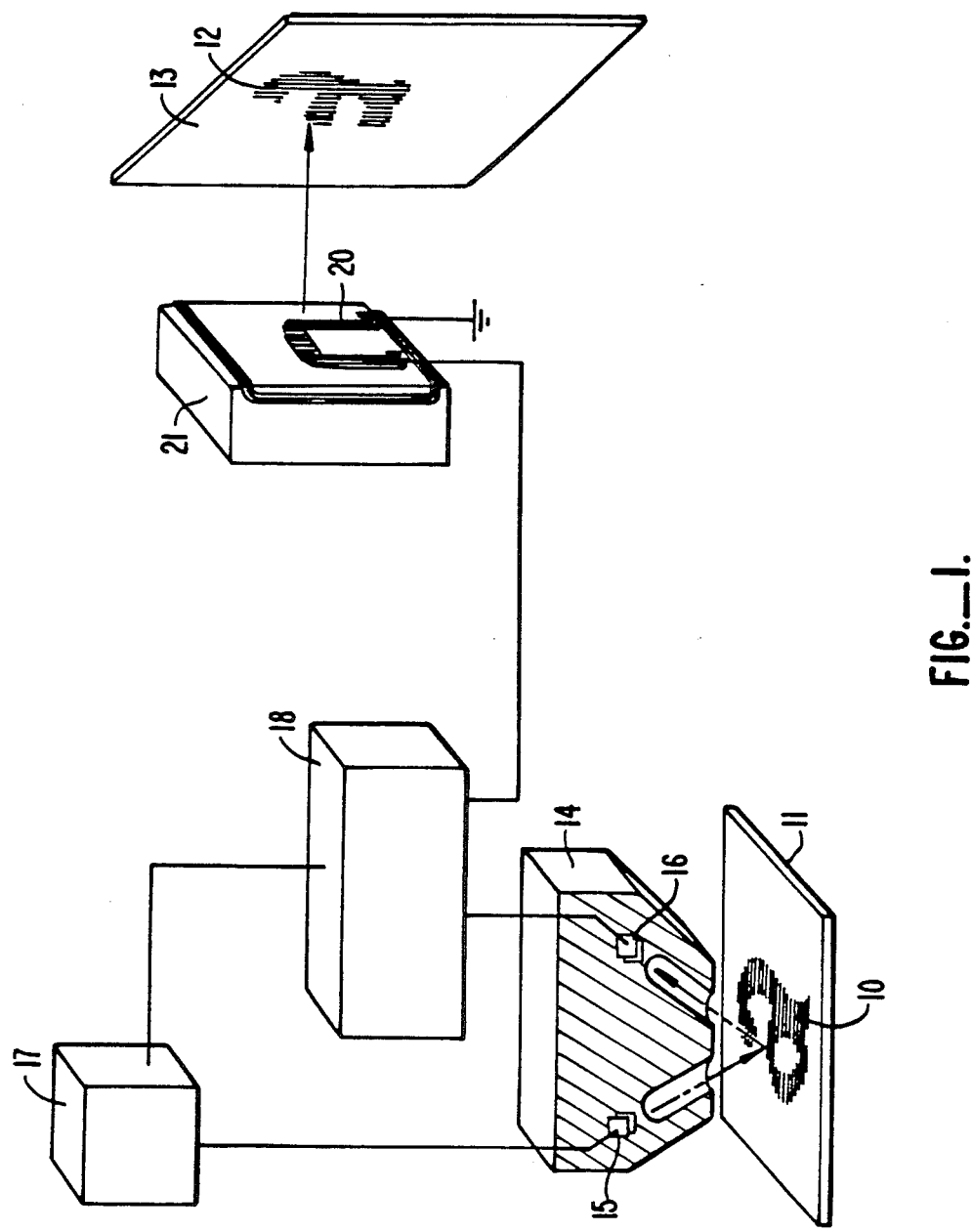
FIG._1.

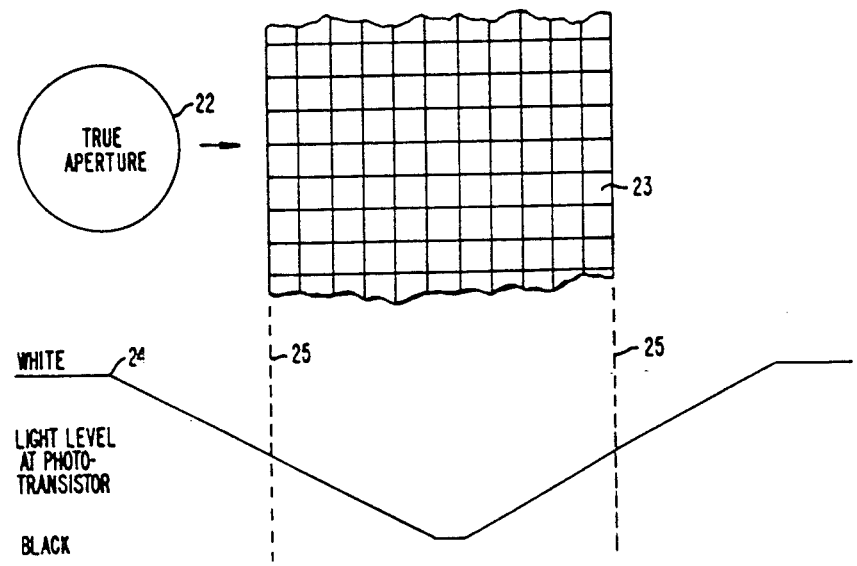
FIG._2.
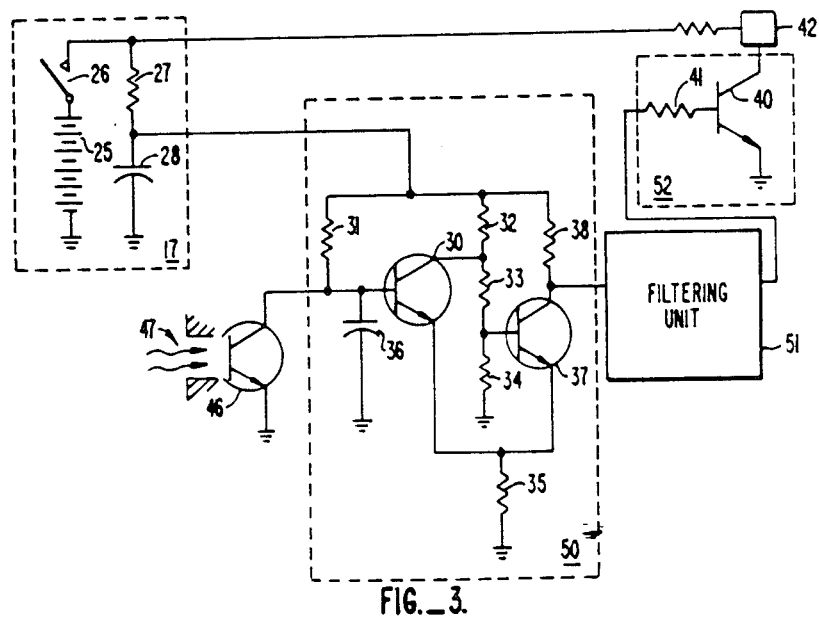
FIG._3.

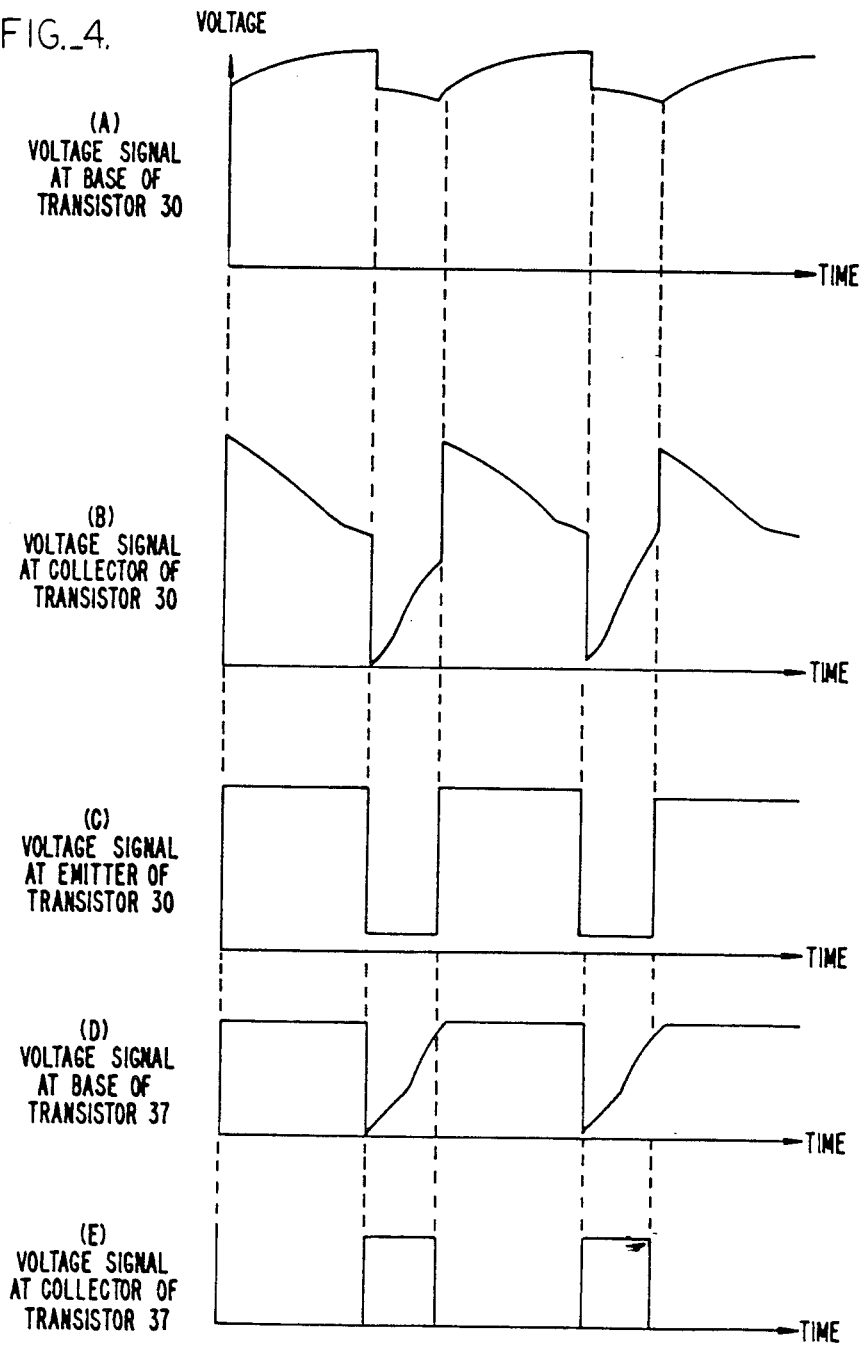

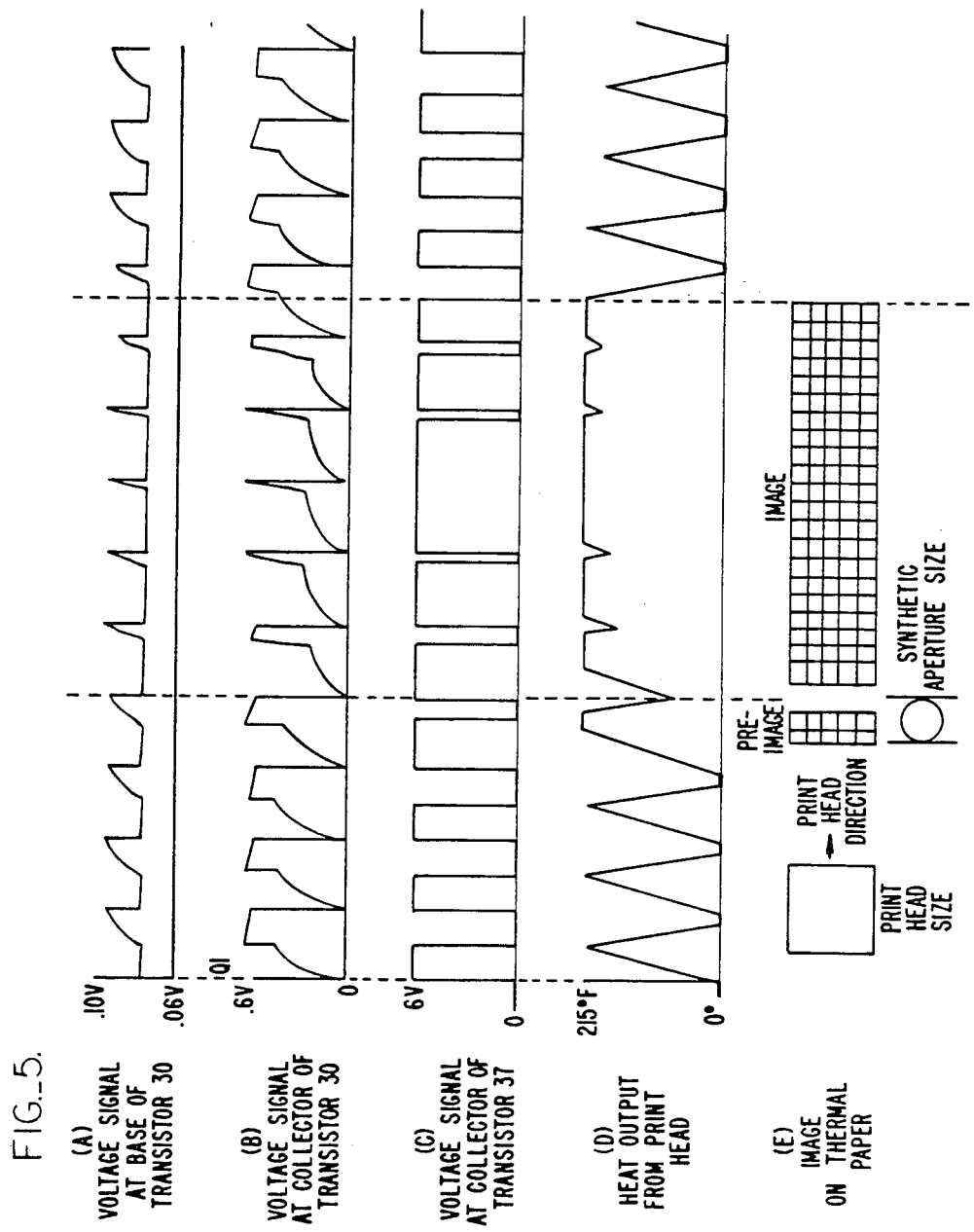

METHOD TO INCREASE SCANNING RESOLUTION USING A SYNTHETIC APERTURE

FIELD OF THE INVENTION

The present invention is related to an electrical circuit for processing signals from scanned objects for the accurate reproduction of images of such objects, and more particularly, a synthetic aperture circuit for increasing the resolution of an aperture receiving radiation from an object for the more accurate reproduction of an image of the object.

BACKGROUND OF THE INVENTION

Scanning systems receive radiation, typically light, from an object through an imaging aperture for transforming the radiation into electrical signals for possible storage and/or reproduction of the image of the object onto some medium. The system scans the objective in some pattern, such as a raster scan, so that the imaging aperture sequentially receives radiation from the entire field of view.

FIG. 1 symbolically represents an exemplary scanning system. As shown in the drawing, a scanning head 14 reads the images of objects on a paper sheet 11 for reproduction of the images upon a second sheet of paper 13. The object is the letter "a". The scanning head 14 has a photodetector, in this case, a photoelectric transistor 16 which is sensitive to the light reflected off the sheet 11 and the image 10. In this example, the light is generated by a light emitting diode (LED) 15, which is also mounted to the scanning head 14. Not shown is a scanning mechanism which drives the scanning head 14 with respect to the sheet 11. As the scanning head 14 moves across the sheet 11 in one direction (and is stepped in a direction perpendicular to the first direction after each line of scanning in the first direction is completed), the phototransistor 16 reacts to the amount of reflected light, i.e., whether the scanned area is light or dark. This sequence of signals is received by a processing circuit 18 for conditioning the signals to power a thermal print head 21. The thermal print head 21 has a heating element 20 to reproduce an image 12 on a sheet 13 of thermally sensitive paper of the object 10. A power supply block 17 supplies the required voltage and currents to the LED 15 and the signal processing block 18.

A problem with all scanning systems is that the aperture through which radiation from the object is received is necessarily of a finite size. Ideally, the size of the aperture should be inifinitely small so that the image of the object is scanned point-by-point. Without an infinitely small aperture, the image of the scanned object is distorted. This degrades the resolution of the scanning system.

Prior efforts to improve the resolution of appertures in scanning systems have used optical components, such as lensès, optical fibers, mirrors, and prisms, to create a focused image of the object received by the scanning system. However, these components require particular attention to their shapes and the relative positioning of the components between themselves and the photodetector. All these concerns add to the cost of the scanning system.

The present invention provides for an efficient and economical way of increasing the scanning resolution of the scanning aperture without the use of optical components.

SUMMARY OF THE INVENTION

The present invention provides for a circuit for processing image signals of an object, the signals generated by scanning radiation from the object through an aperture with a photodetector. The circuit is coupled to the photodetector and has a unit which generates a periodic signal with a duty cycle responsive to the photodetector. The circuit also has another unit coupled to the periodic signal generating unit. The second unit generates an output signal responsive to the duty cycle for the reduction of the effective width of the aperture in the scanning direction. The output signal is sent to an image reproduction element, such as the thermal printhead discussed above. Thus resolution of images of the scanned object are greately improved.

Additionally, the present invention provides for a particular circuit in which the function of generating an output signal responsive to the duty cycle of the periodic signal and function of reproducing the image are merged. In the particular circuit shown, both functions are performed by a thermal printhead.

Finally the present invention may be used in signal element or in multiple element array formates.

BRIEF DESCRIPTION OF THE DRAWINGS

FIG. 1 represents an exemplary scanning system in which images on a first sheet of paper are read and reproduced on a second sheet of paper.

FIG. 2 illustrates the problem of resolution posed by the width of an imaging aperture.

FIG. 3 is an embodiment of the synthetic aperture circuit of the present invention.

FIG. 4 shows the signal wave forms at various points of the periodic signal generation unit of FIG. 3.

FIG. 5 shows the modulation of the signal wave forms of FIG. 4 by the amount of light received through the imaging aperture.

DETAILED DESCRIPTION OF THE INVENTION

FIG. 2 illustrates the problem of aperture resolution in any single or multi-element scanning system, such as that discussed with respect to FIG. 1. Since any photodetector is necessarily responsive to radiation over a certain amount of area, all scanning systems have linitations of resolution caused by the scanning aperture size, or more precisely, the width of the aperture in the scanning direction.

FIG. 2 shows an imaging aperture scanning from left to right with respect to an image 23. As indicated by a line 24, which is indicative of the light through the aperture 22 being received by a photodetector, such as a phototransistor, the intensity of the light begins to drop as soon as the forward or right edge of the aperture 22 encounters the left edge of the dark image 23. As the aperture 22 continues its scan, more and more of the dark image appears before the aperture 22 and the light intensity continues to fall. Only when the aperture is completly blanketed by the image 23 does the light level reach its minimum. However, as soon as the forward edge of the aperture 22 reaches the right hand edge of the dark image 23, the light intensity begins to rise again. The net result is that a dark image having definite edges on a white background is perceived as an image with varying shades of gray having an apparent width in the scan direction of two times the diameter of the aperture 22 plus the true width of the image 23 in the scan direction. Thus image resolution is low.

The use of a comparator to discriminate the light intensity signals into white or black at a predetermined level does not solve all the problems of restoring resolution. For example, the comparator having a discrimination level halfway between the "white" and "black" levels represented in FIG. 2 prevents features having widths up to the diameter of the aperture from being reproduced. Furthermore, techniques which can be used to detect features smaller than the aperture diameter lead to further difficulties. The discriminator can be set at level very close to the "white" level, for example. However, this leads to distortions of the reproduced image. Additional techniques which may be used to compensate for the size and direction of the features of objects to be reproduced add complexity to the scanning system.

The present invention increases image resolution at low cost and is particularly adapted for the scanning of objects at a fixed distance from the scanning aperture. For the particular embodiment discussed below, the present invention increases the resolution of the imaging aperture such that the true diameter of the aperture appears to be reduced to that of an aperture nearly one-third smaller.

FIG. 3 shows an embodiment of the synthetic aperture circuit of the present invention. In this embodiment the synthetic aperture circuit is placed in the signal processing unit 18 of a scanning system. The circuit has basically three parts, a periodic signal generation unit 50, a filtering unit 51 and a driver unit 52, which are connected to a power supply unit 17.

The periodic signal generation unit is coupled to a phototransistor 46 which receives the radiation (light) through a scanning aperture 46, which is symbolically shown. The unit 50 generates a periodic signal which has a duty cycle which is responsive to the phototransistor 46 and the amount of light the phototransistor is receiveing.

The unit 50 is coupled to the filtering unit 51 which generates an output signal responsive to the duty cycle of the periodic signal. The filtering unit discriminates between "black" and "white" when the duty cycle is at a certain predetermined amount, 50%, for example. As explained below, in some embodiments a filtering unit 51 in itself is not used. However, the filtering function is still performed by other circuit elements.

The filtering unit 51 is coupled to the driver unit 52. The unit 52 conditions the output signal from the filter unit 51 to drive a reproduction element 42, such as a thermal printhead or an acoustic unit for modem communication over telephone lines.

The particular details of the periodic signal generating unit 50 are as follows. A first transistor 30 has its base electrode is connected to the collector electrode of the phototransistor 46. The base electrode of the transistor 30 is also connected through a resistor 31 to the power supply 17 and connected to ground through a capacitor 36. The emitter electrode of the transistor 30 is connected to ground through a resistor 35, while the collector electrode of the transistor 30 is connected to the power supply 17 through a resistor 32.

The unit 50 also has a second transistor 37 which has its base electrode connected to the collector electrode of the transistor 30 through a resistor 33 and connected to ground through another resistor 34. The emitter electrode of the transistor 37 is connected in parallel to the emitter electrode of the transistor 30 to ground through the resistor 35. The collector electrode of the transistor 37 is connected through a resistor 38 to the power supply 17.

A periodic signal is generated by the switching of the first transistor 30 "off" and "on" (in the sense of operating the transistor in the linear region where it can be saturated, or respectively baised to an off condition) through the charge and discharge of the capacitor 36. The second transistor 37 operates to amplify the output signal of the transistor 30 in a complementary fashion, i.e., when transistor 30 is high, the output of the second transistor 37 is low and when the traqnsistor 30 is low. the output of the transistor 37 is high.

The operation of the unit 50 is illustrated in FIGS. 4A –4E which details the waveforms of the voltage signals at various nodes of the circuit 50 having particular values for the circuit elements. The transistors 30, 37 are discrete transistors, part no. 2N2222, with the resistor 31 having an adjustable value of 500 to 1000 Kohms, the resistor 32 having a value of 4.7 Kohms, the resistor 33 1 Kohms, the resistor 34 6.7 Khoms. The capacitor 36 has a capacitance of 10 pFs. It should be noted that the resistance 31 is adjustable to provide an adjustable contrast for the images to be reproduced.

Assuming that the transistor 30 is off, the capacitor 36 and the base electrode of the transistor 30 begins to charge by the current through the resistor 31 and the leakage current through the resistor 32 and reverse biased collector-base junction of the transistor 30. The voltage at the base electrode becomes higher and higher as the capacitor 36 charges until the transistor 30 turns on. At this point the voltage at the base electrode drops and the discharge of the capacitor begins. Since the transistor 30 is now on, the current through the resistor 32 is such that the voltage on the base electrode of the second transistor 37 lowered to turn that transistor off. With the transistor 37 off, the amount of current through the resistor 35 is decreased which permits further discharge of the capacitor 36. Finally, the discharge of the capacitor 36 is such that the voltage on the base electrode of the transistor 30 is so low that the transistor 30 turns off and the charging of the capacitor 36 begins once more. The charge and discharge cycle of the base electrode of the transistor 30 is shown in FIG. 4A.

The output signal at the collector electrode of the transistor 30 is shown in FIG. 4B. When the transistor 30 is biased nominally off, the voltage at the collector electrode (the voltage between resistors 32 and 33) drops as the charge at the base electrode of the transistor 30 builds. This voltage drop is due to the fact that the transistor 30 is not truly off, but actually operating in the linear region. Thus, more and more current is drawn through the resistor 32 as the charge on the capacitor 36 builds until the transistor 30 is saturated on. At this point, the voltage of the collector electrode drops near ground.

After the initial surge through the transistor 30, less current enters the base of the transistor 30 and the amount of current drawn through the resistor 32 and the collector electrode falls, thereby causing the voltage at the collector electrode to rise. The rise continues until the transistor 30 is "biased off" in its linear region. The charge on the capacitor 36 once again builds for another cycle.

FIG. 4D illustrates the state of the transistor 37. When the transistor 30 is fully off, the transister 37 is on and the voltage at the base electrode of the transistor 37 is a constant, due to the base-emitter voltage drop and the small resistance of the transistor 35. When the transistor 30 is on and the transmitter 37 is off, the base electrode of the transistor 37 tracks the voltage of the collector electrode of the transistor 30 because the transistor 37 is off.

The resulting output signal of the transistor 37 is shown in FIG. 4E. Note that the signal now is more or less a square wave with the signal high when the transistor 30 is on and the transistor 37 is off. The orignal signal at the base of the transistor 30 of a few tenths of a few hundredths of a volt has been amplified to a voltage swing of about 6 volts and shaped into a square wave format.

Images are picked up by the modulation by the phototransistor 46 of the signal at the base electrode of the transistor 30. The amount of incident radiation received by the phototransistor 46 turns the transistor 46 off and on to thereby affect the rate of charging of the capacitor 36. When a large amount of incident radiation is received by the phototransistor 46, for example, the scanning of a white area, more time is required for the capacitor 36 to charge. This is due to the fact that the phototransistor 46 diverts some of the current through the resistor 31 and the resistor 32 (through the reversed biased base-collector junction of the transistor 30).

This modulation of the charging cycle of the capacitor 36 (as the scanning aperture 47 makes the white-to-black-to-white transitions of FIG. 2) is shown in FIG. 5A. What results is a modulation of the length of time the output signal from the collector of the transistor 37 is high. That is, the duty cycle of the periodic signal generated is modimied by the amount of light received by the phototransistor 46. It should be noted, though, that the period of the cycle is not necessarily constant. It has been found to change by approximately 20%. This modulation of the duty cycle of the output of the unit 50 is used to resolve the image which is received through the scanning operation of the phototransistor 46.

The modulated signal from the periodic signal generation unit 50 is fed into the filtering unit 51. The filtering unit 51 operates as a low-pass filter, a type of circuit well known to those skilled in the electronic circuit field. The unit 51 transmits a signal to the driver unit 52 indicative of a "black" reading when the duty cycle of the modulated signal of the unit 50 exceeds a certain level. At this point the driver unit 52 switches to turn on the reproduction element 42.

The filtering operation of the modulated periodic signal from the unit 50 can be performed by specialized circuits, such as a circuit for pulse width modulation to generate either audio and electrical signals for modem signals accoding to CCITT T1 or T2 standards. An vertical array of phototransistors 46 with corresponding periodic signal generation units 50 can be used for the higher performance CCITT T3 applications.

The filtering unit 51 may even be eliminated in certain applications. FIG. 5D illustrates the heat of a thermal printhead which is used as the reproduction element 42; FIG. 5E illustrates the resulting image.

The printhead receives the signal from the driver transistor 40 of the driver unit 52, which in turn receives the modulated signals directly from the periodic signal generation unit 50 without the intervention of the filtering unit 51. As indicated by the sawtooth wave forms, the printhead has a definite response time, i.e., a time for the print head to heat up to a maximum temperature and then fall. By a matching of the RC time constant and frequency of the unit 50 and the response time of the print head, the print head itself, the output device, acts as a filtering circuit which is responsive to the particular duty cycle from the output signal on the circuit 18. As indicated in FIGS. 5C and 5D, the thermal head remains on to a greater or lesser degree when the duty cycle of the output signal exceeds a certain amount. The image is reconstructed upon heat-sensitive (thermal) paper matched to the thermal head. In this way, the output device and the filtering circuit are combined into one. Filtering is performed thermally, rather than electronically.

Matching or adjuctment of the particular thermal printhead (with its particular thermal mass) to the sensitivity of the thermal paper and the scanning speed of the printhead also improves the reproduced image. By a proper matching it is possible to create image features on the thermal paper which are narrower than the width of the print head. FIG. 5E illustrates a possible effect in the present imaging system. An "pre-image" appears before the image proper due to the heating cycle of the printhead as it reaches the image. By a matching the pre-image can be minimized. The pre-image is smaller than the size of the printhead and is indicative of the resolution of the matched printhead.

The net result for the embodiment above is that an imaging aperture of 0.021 inches operates as an aperture of only 0.0085 inches in diameter. The apparent or synthetic aperture has resolution three diameters finer than its true size. This technique has the further advantage that the imaging aperture is not required to contact the viewed object, such as the case of bar code scanners. In the case of facsimile machines and the photocopiers, the present invention allows the aperture to be displaced 0.125 inches or greater from the original document surface thereby avoiding many problems if contact were required.

Thus, by matching the requirements of a particular scanning system with the actual limitations of the phototransistor and its output device, the present invention can be modified to substantially reduce the aperture of the scanning head in the scanning direction for a very high degree of resolution.

The resolution of the circuit is dependent upon the period of oscillation of the transistor 30. This period is dependent upon the charge and discharge cycle of the capacitance element 36, which is determined by the RC time constant for the periodic signal generation unit 50, where C is the capacitance of the capacitance element 36 and R is the total resistance of the current path charging the element 36. The RC time constant for a particular application is determined by multipling the desired resolution, the dots per inch, by the scan rate, the speed at which the scan head moves across the area to be scanned. This product yields a maximum frequency. The maximum image frequency is multiplied by an arbitrary factor, say 3, to provide an adequate resolution. This yields the required RC time constant. It should be noted that this is a theoretical calculation and that in practice the response time of the phototransisor 46 must be accounted for. Furthermore, the response time of the device reproducing the scanned object must also be considered as discussed above. If the response time of the phototransistor or the image reproduction device is too long, then it cannot provide the desired resolution of the image which is reproduced.

The frequency of the periodic signal can be increased by making the capacitance element 36 smaller. The reduction in capacitance reduces the RC time constant and makes the frequency of the oscillation of the transistor 30 higher. However, a practical limitation of about 1 pF for for capacitance element 36 exists for the particular discrete element embodiment of the periodic signal generation unit 50 discussed previously. For smaller capacitances and higher frequencies, an integrated circuit form of the periodic generation unit 50 avoids many of the problems of higher frequency, such as parasitic capacitances and uncertain response times of the transistors.

At higher frequences the wave forms of the signals of the previously discussed embodiment of the unit 50 are essentially the same as those in FIG. 5 with some variation in the period and amplitude of the signals. The particular shapes of the signals are also slightly defferent. Most of these changes can be attributed to the peculiarities of the response of the transistors 30, 37. The linear bias and switching regions shift with frequency. Also, the magnitude of the signals produced diminish with greater speed (slew rate). However the circuit remains operational if these variations are accounted for.

The present invention is also useful in linear arrays, such as discussed with respect to the CCITT T3 communication standard. A system having a vertical array of imaging apertures or a slit with aligned phototransistors or a linear CCD device as the photodetector element can benifit from the increased resolution of the present invention.

Therefore, while the present invention has been described with respect to particular embodiments, the present invention should be considered limited only by the meets and bonds of the appended claims.

What is claimed is:

1. A circuit for processing image signals of an object, said signals generated by scanning radiation from said object through an aperture to photoelectric means responsive to the radiation, signal processing comprising:
   means coupled to said photoelectric means for generating a periodic signal, wherein said periodic signal has a duty cycle responsive to said photoelectric means; and
   Response to Office Action, Pager 1 of 3
   means coupled to said signal generating means for generating an output signal responsive to said duty cycle;
   whereby the effective width of said aperturee in the scanning direction is reduced synthetically due to the signal processing of circuit.

2. The circuit as in claim 1 wherein said output generating means is responsive only to said periodic signals with duty cycle greater than a predetermined non-zero amount.

3. The circuit as in claim 2 wherein said output generating means is an output device for forming an image of said object.

4. The circuit as in claim 3 wherein said output generating means comprising thermal printhead.

5. The circuit as in claim 1 wherein said periodic generating means comprises a first transistor having a collector electrode coupled to a first reference voltage source (power source) through a first resistive means, and an emitter electrode coupled to a second reference voltage source (ground) through a second resistive means, and a base electrode coupled to said first reference voltage source through a third resistive means and to said second reference voltage source through capacitive means, whereby said first transistor switches off and on periodically with the charging and discharging of said capacitive means.

6. The circuit as in claim 2 wherein said capacitive means comprises parasitic capacitance at said first transistor base electrode.

7. The circuit as in claim 5 wherein said third resistive means and said capacitive means are connected serially between said first and second reference voltage sources and said transistor base electrode is connected between said third resistive and capacitive means.

8. The circuit as in claim 7 wherein said first resistive means is connected to said first reference voltage source and said capacitive means is connected to said second reference voltage source.

9. The circuit as in claim 5 further comprising a second transistor having a collector electrode coupled to said first reference voltage source through a fourth resistive means, an emitter electrode coupled to said second reference voltage source through said second resistive means, and a base electrode coupled to said collector electrode of said first transistor through a fifth resistive means and to said second reference voltage through a sixth resistive means, so that said second transistor oeprates to amplify the signal received from said first transistor collector electrode.

10. The circuit as in claim 9 further comprising an output terminal connected to said collector electrode of said second transistor for connection to said output generating means.

11. The circuit as in claim 9 further comprising a filtering unit which receives the signal from the collector electrode of said second transistor and is connected serially to a driving means, a reproduction element, and said first reference voltage source.

12. The circuit as in claim 1 wherein the amount of said reduction of the effective aperture width can be varied.

13. The circuit as in claim 12 wherein said variation is accomplished by varying the RC time constant of said signal generating means.

* * * * *